July 16, 1940.  H. J. MANKOFF  2,207,811
COMPOST MIXING AND GRINDING MACHINE
Filed Dec. 17, 1938   3 Sheets-Sheet 1

INVENTOR.
HENRY J. MANKOFF
BY
ATTORNEY.

July 16, 1940. H. J. MANKOFF 2,207,811
COMPOST MIXING AND GRINDING MACHINE
Filed Dec. 17, 1938 3 Sheets-Sheet 2
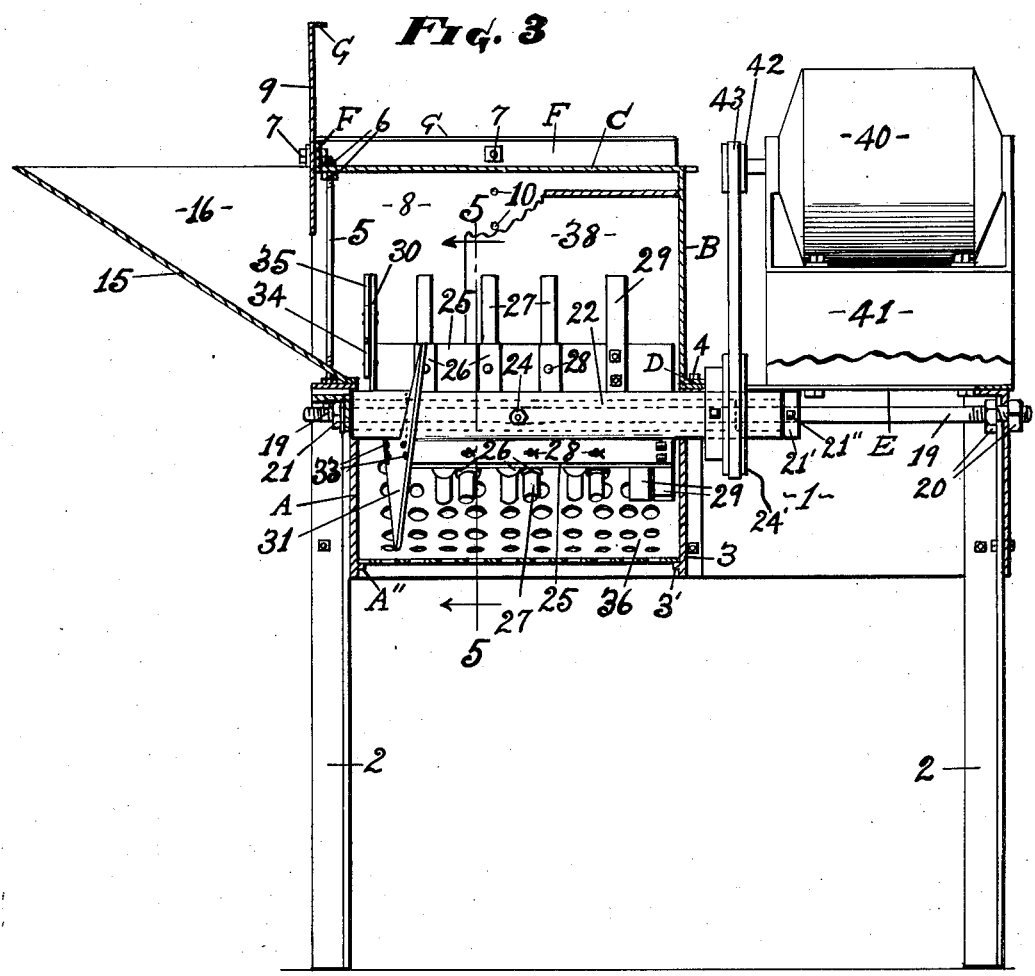
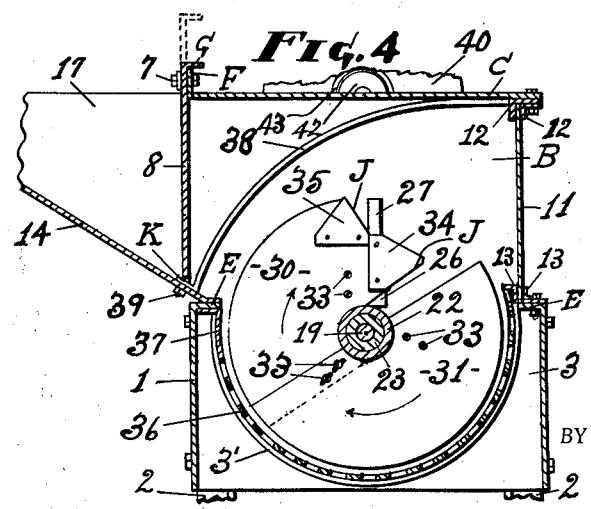
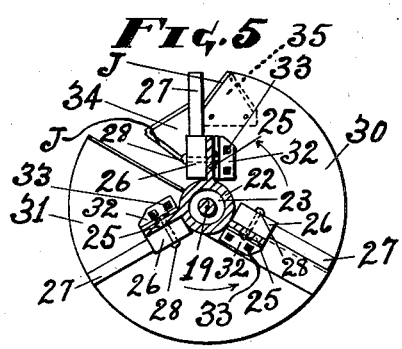
INVENTOR.
HENRY J. MANKOFF
BY U. G. Charles
ATTORNEY.

July 16, 1940.　　　H. J. MANKOFF　　　2,207,811
COMPOST MIXING AND GRINDING MACHINE
Filed Dec. 17, 1938　　　3 Sheets-Sheet 3
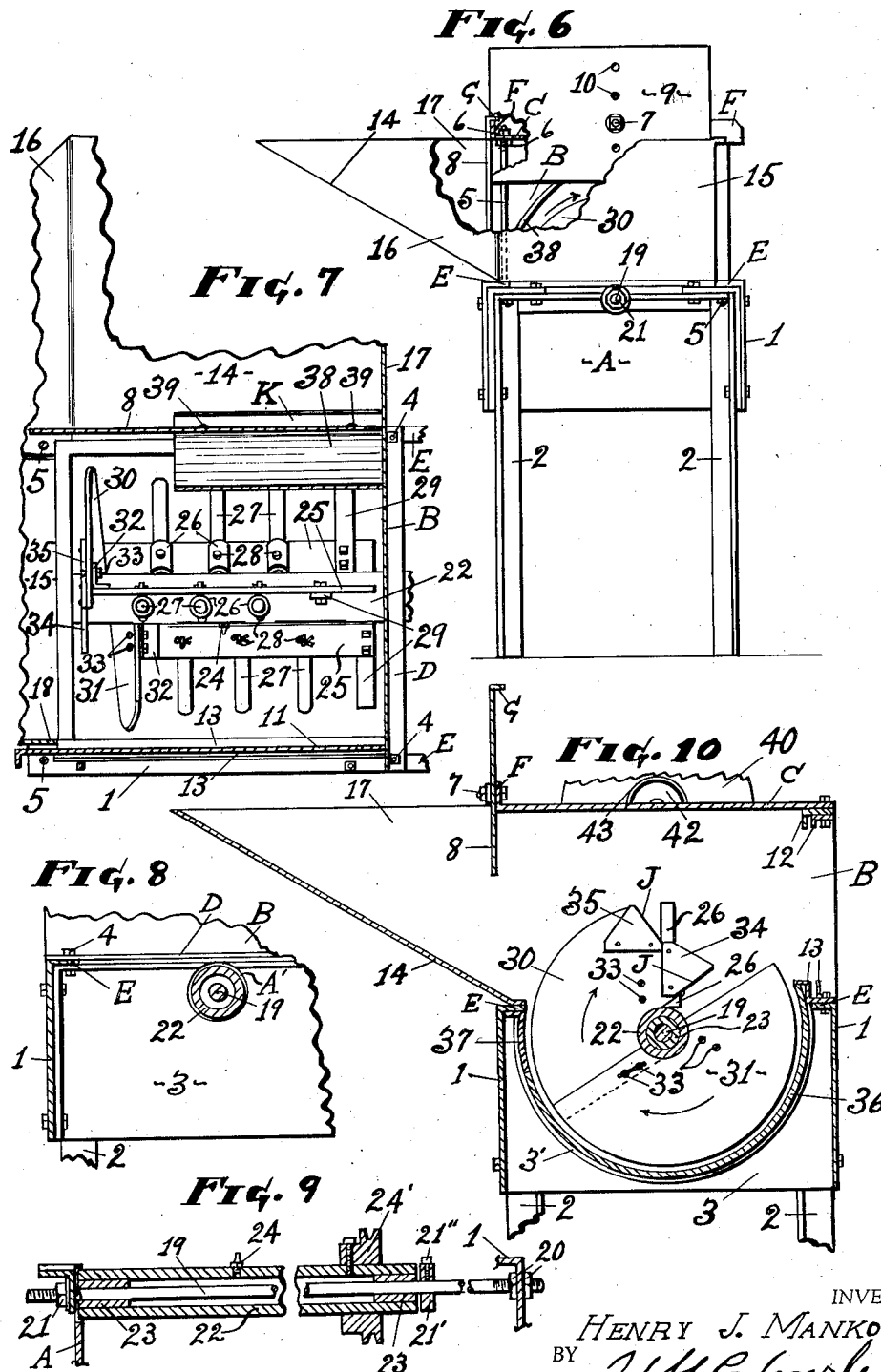
INVENTOR.
HENRY J. MANKOFF
BY U. G. Charles
ATTORNEY.

Patented July 16, 1940

2,207,811

UNITED STATES PATENT OFFICE 2,207,811

COMPOST MIXING AND GRINDING MACHINE

Henry J. Mankoff, Wichita, Kans.

Application December 17, 1938, Serial No. 246,372

3 Claims. (Cl. 83—11)

My invention relates to a compost mixing and grinding machine, and has for its principal object a mixing and grinding cylinder positioned in its supporting frame and with respect to feeding chutes carried by the frame whereby the compost may be fed into the cylinder at its end or side selectively or simultaneously.

A further object of my invention is to provide a slicing blade secured to and rotatable with an auger attached at the end of the cylinder and rotatable therewith to slice the substance and throw the same into the cylinder when such substance is of a mucky texture, or to shred a solidified bulk or fibrous growth by cutting the same prior to entering the cylinder.

A still further object of my invention is to provide a machine that will discharge the compost downward or outward from one side of the cylinder, selectively.

A still further object of my invention is to produce a compost machine that is inexpensive to construct, efficient in its performance and inexpensive to operate with respect to its motor power.

These and other objects will hereinafter be more fully explained, reference being had to the accompanying drawings forming a part of this specification, and in which like characters will apply to like parts in the different views.

Referring to the drawings—

Fig. 3 is an enlarged view similar to that of Fig. 2 but sectionally shown.

Fig. 4 is a sectional view taken on line 4—4 in Fig. 2 showing the perforated arcuate plate, side enclosures and the arcuate deflector.

Fig. 5 is a sectional view taken on line 5—5 in Fig. 3.

Fig. 6 is an end view opposite the motor.

Fig. 7 is a sectional view taken on line 7—7 in Fig. 2.

Fig. 8 is an enlarged fragmentary sectional view taken on line 8—8 in Fig. 2.

Fig. 9 is a longitudinal section through the tubular shaft of the grinding cylinder, the rod being in elevation and parts being broken away for convenience of illustration.

Fig. 10 is a sectional view similar to that shown in Fig. 4 except certain features, namely, side enclosures being open, deflector removed and the arcuate perforated plate substituted by a solid plate.

The structure herein disclosed consists of a housing comprising a frame 1 rectangular in form and being supported by legs 2, each of which are secured by suitable means in their respective corners of the frame, said frame being open at the top and bottom thereof, and being divided medially of its length by a wall 3, each end of which is secured by suitable means to its respective side wall. Wall 3 and end wall A medially of their length have an arcuate opening A' to clear the periphery of a tubular shaft of a cylinder later described. It will be understood that said walls A and 3 are cast, the confronting sides of which have an arcuate shoulder A'' and 3' respectively upon which the ends of an arcuate plate, hereinafter described, will seat.

Figure 1:
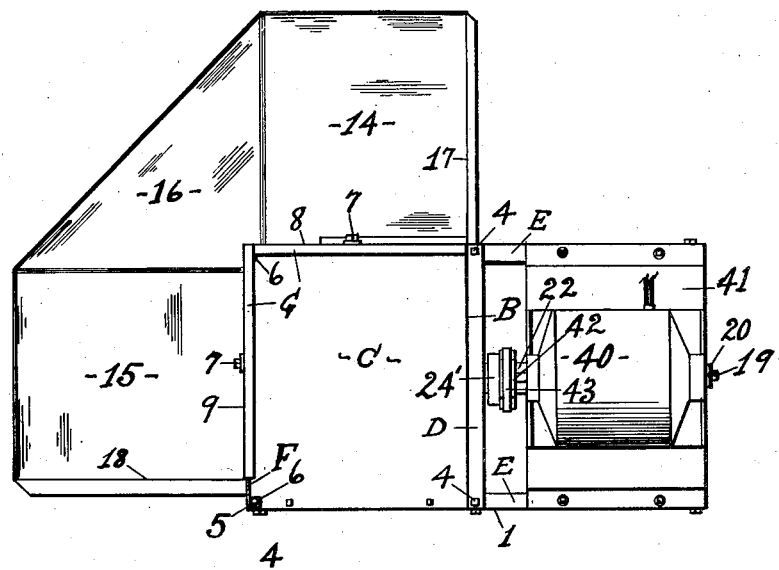
Fig. 1 is a plan view of the machine.
Figure 2:
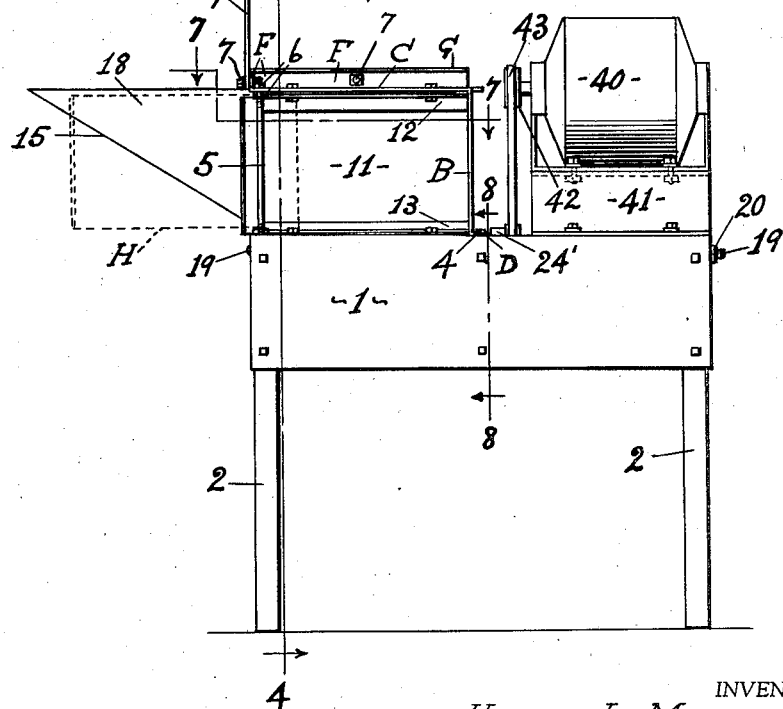
Fig. 2 is a side view opposite the side chute.

As an enclosure for the cylinder above referred to there is provided a sheet metal structure consisting of an end wall B and a top portion C bent at right angles to each other, said end wall B being secured to the rectangular frame by bolts 4 extending through flanges D and E that are integrally joined to their respective end wall and rectangular frame as shown in Fig. 1. The free end of the top portion C is supported by rods 5 secured to said frame 1 and extending upward through their respective corners of the top portion which is carried by nuts 6 threadedly engaging on the upper ends of the rods as shown in Figs. 3 and 6, and the said top portion C has a flange F on its free end and on one side as shown in Fig. 3, each of which are centrally apertured to receive a bolt 7 positioned therein, by which means plates 8 and 9 are adjustably carried and may be removed as each plate has a series of vertically alined apertures 10 to engage their respective bolts, the upper edge of each plate having a flange G turned thereon as stiffening means therefor. Being so arranged will provide a side or end feed to the cylinder by opening said plates selectively while the other side opposite the last named side is equipped with a plate 11 slidably engaging in guides 12 and 13 by which means said plate may be closed or opened as shown by dotted lines H in Fig. 2 for the purpose later described. The side and end feed openings each have a feed chute 14 and 15 respectively and the said chutes being joined by their adjacent edges by a plate 16 whereby substance may be moved from one chute to the other, and also permit side or end feeding separately or simultaneously as the case may require. To retain substance in the said chutes there is on the outer edge of each a side wall 17 and 18 respectively.

Positioned in frame 1 and extending through each end thereof is a rod 19, the rod being secured against rotation by lock nuts 20 threadedly engaging on one end thereof while the other end has a nut 21 threadedly engaging thereon, and on said rod is trunnioned a compost mixing and grinding cylinder, the position of the cylinder being in working relation to the said chute arrangements and secured in such position by a collar 21' that is attached to the rod by a set screw 21".

The cylinder consists of a tubular shaft 22 having a bearing 23 at each end thereof to engage on the rod, by which means an oil tight chamber is formed, the oil being injected through a Zerk fitting 24 for continuous lubrication through a period of time, and the said tubular shaft has a sheave 24' secured adjacent its inner end to receive a belt from a motor later described. Secured to said tubular shaft is a plurality of blades 25 radially extending therefrom and each thereof have a plurality of sleeves 26 secured thereto and spaced therealong in staggered relation to those carried by each blade. In each of said sleeves is secured a cylindrical hammer 27 through the medium of a bolt 28 as shown in Figs. 3, 5 and 7; being so arranged, the said hammers may be turned to reverse the cutting edge thereof.

The last hammer at the inner end of the cylinder consists of a member 29 rectangular in cross section, the inner end of which is secured to its respective blades, said hammers to function as a throw to discharge foreign substance that is impervious to comminution. Such substance may be discharged from the side opening of the cylinder housing, and the hammers being rectangular in form tend to prevent side movement of such substance which otherwise would occur by the use of a cylindrical form. The deposits of such substance referred to is through the blast of an auger secured to the feed end of the tubular shaft and rotatable therewith, the auger comprising one wind and consisting of two web members 30 and 31 separately arranged, and each being secured by legged arms 32 to their respective ends of said blades by welding one leg thereto while the other leg is secured to the web of the auger by bolts 33. On the outer or feed end of said auger is secured a pair of cutting blades 34 and 35, the cutting edges of which as at J are positioned substantially transverse to each other to vary their contact with substance being sliced preparatory to entering the cylinder, and the cutting edges are adapted in their rotation to engage in close proximity to the inner end of chute 15 or carrying means therefor optional with the manufacturer, and on which substance will be supported, sliced and forced into the cylinder by the pitch wind of the auger.

The cutting edge of blade 34 has a lesser degree of angular contact with the end of the chute than the cutting edge of blade 35, the cutting edge of last said blade being on the greater diameter with respect to the auger axis has a smaller cutting resistance owing to its prolongation of contact with the substance over that of the cutting edge of the inner blade 34, by which arrangement the cutting resistance of each blade is substantially equalized.

As heretofore stated, the said walls A and 3 have an arcuate shoulder on their confronting sides and upon which is seated the ends of an arcuate plate 36 and being secured thereon by one edge abutting a stop element 37 as shown in Figs. 4 and 10, the other edge being secured by a Z bar which is the inner portion of guide 13, said bar being detachable to remove and install the arcuate plate. The said plate may be perforated as shown in Figs. 3 and 4 through which the substance will pass as ground and the said perforated plate may be substituted by a solid plate as shown in Fig. 10, in which case, the compost in its course of treatment passing through the cylinder is discharged through the opening of plate 11 when said plate is removed. Positioned in the upper enclosure for the cylinder is an arcuate plate 38, extending from wall B and terminating a spaced distance inward from the feed chute 15, said plate removably arranged and being secured by bolts 39 engaging in apertures passing through the flange K of said plate and through the chute adjacent thereto, while the upper edge of said plate snugly engages with guide 12, and being so positioned, will function as a deflector coacting with the discharge of the said side opening, and when said opening is closed by its respective plate the substance will discharge through the perforated plate as shown in Fig. 4, however the last named discharge will be accomplished by closing plates 8 and 11 in the absence of plate 38; furthermore, the substance is free to discharge through the opening of plate 11, in which case, a solid arcuate plate is installed substituting the said perforated plate as shown in Fig. 10.

The motive power to turn the cylinder consists of an electric motor 40 that is secured to a support 41 attached to and upwardly extending from the rectangular frame 1, the motor having a sheave 42 and a belt 43 connecting said sheave with the cylinder sheave, heretofore described, as turning means for the cylinder, there being an electric source to energize the motor.

Prior to this invention grinding machines have been manufactured having a rotatable cylinder within a housing and means to conduct the substance ground thereby, but such I do not claim broadly as my invention comprises a cylinder having a cutting element on one end thereof that will govern and partially prepare substance as it enters the cylinder for final comminution, discharging the same through a side opening or a screen circumscribing approximately one half of the cylinder. I also provide a machine having an axial feed for a variety of different textured substances, all of which may require cutting in short length, more particular that of a fibrous growth, and the same means to slice substance of earthen or mucky nature and a pulverized portion of such material may be moved to the side feed of the cylinder; furthermore, a machine that the cylinder thereof may be enclosed to retain substance for continuous agitation through a period of time as the case may require, and such modifications may be employed as lie within the scope of the appended claims.

Having fully described my invention what I claim as new and desire to secure by Letters Patent is:

1. In a compost mixing and grinding machine, a housing of the class described comprising a rectangular frame having vertically disposed sides and ends and legs to support the frame, a rod extending through the frame in close proximity to the upper plane thereof and being carried rigidly by the frame ends medially of their length, a mixing and grinding cylinder trunnioned on the rod, the cylinder being approximately equal to one half in length to that of the frame and extending from one inward, a spirally wound web secured to the cylinder adjacent its outer end and rotatable therewith, the web not to exceed one wind, the inner end terminating radially while the outer end terminates tangentially with respect to the axis on which the cylinder turns, a pair of cutting blades secured to the last named end of the web by which means substance is severed in short length and conveyed to the cylinder, the cylinder comprising a tubular shaft and a bearing at each end thereof to engage on the rod and seal the ends of the shaft fluid tight by which means an oil chamber is formed about the rod, blades radially extending from the tubular shaft, a plurality of cylindrical sleeves spaced along each blade and a removable cylindrical hammer element secured in each sleeve, the hammers being reversible by turning the same on their diametrical axis, the housing having a feed opening adjacent the outer end and one side of the cylinder respectively, a combined feed chute communicating with each opening substantially as shown, and a motor to turn the cylinder and a source of power to actuate the same.

2. In a compost mixing and grinding machine, as recited in claim 1, the cylinder having a hammer element rectangular in cross section secured to each blade adjacent its inner end functioning as a discharge for foreign elements from the compost.

3. In a compost mixing and grinding machine, a housing of the class described comprising a rectangular frame having vertically disposed sides and ends and legs to support the frame, a rod extending through the frame in close proximity to the upper plane thereof and being carried rigidly by the frame, a mixing and grinding cylinder trunnioned on the rod, a spirally wound web secured to the cylinder adjacent its outer end and rotatable therewith, the inner end of the web terminating radially while the outer end terminates tangentially with respect to the axis on which the cylinder turns, a pair of cutting blades secured to the last named end of the web by which means substance is severed in short length and conveyed to the cylinder, the cylinder comprising a tubular shaft and a bearing at each end thereof to engage on the rod and seal the ends of the shaft fluid tight by which means an oil chamber is formed about the rod, blades radially extending from the tubular shaft, a plurality of cylindrical sleeves spaced along each blade and a removable cylindrical hammer element secured in each sleeve, the hammers being reversible by turning the same on their diametrical axis, the housing having a feed opening adjacent the outer end and one side of the cylinder respectively, a combined feed chute communicating with each opening substantially as shown, and a motor to turn the cylinder and a source of power to actuate the same.

HENRY J. MANKOFF.